(12) United States Patent
Noordman et al.

(10) Patent No.: US 9,476,020 B2
(45) Date of Patent: *Oct. 25, 2016

(54) METHOD AND APPARATUS FOR THE RECOVERY OF PVPP AFTER CONTACT WITH A YEAST FERMENTED BEVERAGE BY SEDIMENTATION SEPARATION

(75) Inventors: Tom Reinoud Noordman, Oegstgeest (NL); Marcel Van Der Noordt, Middelharis (NL); Anneke Richter, Leiden (NL)

(73) Assignee: Heineken Supply Chain B.V., Zoeterwoude (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/811,223

(22) PCT Filed: Jul. 18, 2011

(86) PCT No.: PCT/NL2011/050522
§ 371 (c)(1),
(2), (4) Date: Mar. 29, 2013

(87) PCT Pub. No.: WO2012/011806
PCT Pub. Date: Jan. 26, 2012

(65) Prior Publication Data
US 2013/0183402 A1 Jul. 18, 2013

(30) Foreign Application Priority Data

Jul. 22, 2010 (EP) .................................. 10170419

(51) Int. Cl.
| C12C 11/11 | (2006.01) |
| B01D 41/02 | (2006.01) |
| C12H 1/056 | (2006.01) |
| B01D 15/00 | (2006.01) |
| B01J 20/26 | (2006.01) |
| B01J 20/34 | (2006.01) |

(52) U.S. Cl.
CPC ............... *C12C 11/11* (2013.01); *B01D 15/00* (2013.01); *B01D 41/02* (2013.01); *B01J 20/261* (2013.01); *B01J 20/267* (2013.01); *B01J 20/3425* (2013.01); *B01J 20/3475* (2013.01); *C12H 1/0424* (2013.01)

(58) Field of Classification Search
CPC .... C12H 1/0424; C12H 1/063; C12H 1/061; C12H 1/02; C12H 1/04; C12H 1/0408; C12H 1/0416; C12H 1/22; B01D 41/02; B01D 2321/164; B01J 20/26
USPC ........ 426/330.4, 422, 330.3, 330.5, 16, 590, 426/592, 12, 490, 495, 11; 210/670, 692, 210/500.41, 502.1, 651, 653, 690, 193, 254, 210/269, 500.21, 500.23, 500.27, 500.34, 210/500.35, 500.37, 500.42, 503, 506, 615, 210/635, 636, 639, 650, 654, 669, 741, 758, 210/777, 778, 792, 797, 798, 806
See application file for complete search history.

(56) References Cited

U.S. PATENT DOCUMENTS

| 5,262,053 A | 11/1993 | Meier |
| 5,801,051 A | 9/1998 | Kiefer et al. |
| 6,117,459 A | 9/2000 | Van Den Eynde et al. |
| 2005/0279374 A1* | 12/2005 | McGrath et al. ............. 131/364 |
| 2009/0291164 A1 | 11/2009 | Meffert et al. |
| 2010/0062104 A1 | 3/2010 | Schneid |

FOREIGN PATENT DOCUMENTS

| EP | 0 551 245 A1 | 7/1993 |
| GB | 2 288 608 A | 10/1995 |
| WO | WO-99/13048 A2 | 3/1999 |
| WO | WO-99/16531 A1 | 4/1999 |
| WO | WO-99/47636 A2 | 9/1999 |
| WO | WO-99/60090 A1 | 11/1999 |
| WO | WO-02/102960 A1 | 12/2002 |
| WO | WO-2010/052130 A2 | 5/2010 |

OTHER PUBLICATIONS

Database FSTA [Online] International Food Information Service (IFIS), Frankfurt-Main, DE; Dahmus M. et al: "PVPP-treatment and regeneration in a whirlpool. (translated) TIOL-PVPP Behandlund and Regeneration im Whirlpool.", XP002614802, Database accession No. FS-1989-12-H-0006, Abstract.
Database FSTA [Online] International Food Information Service (IFIS), Frankfurt-Main, DE; Dahmus M. et al: "PVPP-treatment and regeneration in a whirlpool. (translated) TIOL-PVPP Behandlund und Regeneration im Whirlpool.", XP002614802, Database accession No. FS-1989-12-H-0006, Abstract.
International Preliminary Report on Patentability for PCT/NL2011/050522—mailed Sep. 7, 2012.
International Preliminary Report on Patentability for PCT/NL2011/050523—Jul. 16, 2012.

(Continued)

*Primary Examiner* — Vera Stuli
(74) *Attorney, Agent, or Firm* — Foley & Lardner LLP; Sunit Talapatra

(57) ABSTRACT

A method of preparing a yeast fermented beverage is provided, which method comprises (a) fermenting wort with a biologically active yeast to produce a fermented liquid; (b) combining the fermented liquid with polyvinylpolypyrrolidone (PVPP) particles to bind at least a fraction of the polyphenols and/or proteins contained in the fermented liquid; (c) removing a slurry containing the PVPP particles and yeast from the fermented liquid; (d) separating said slurry into a yeast-enriched fraction and a PVPP-enriched fraction a technique selected from flotation separation, settling separation and separation using a hydrocyclone; (e) regenerating the PVPP particles before, during and/or after the separation by desorbing polyphenols and/or protein from said PVPP-particles; and (f) recirculating the regenerated PVPP particles to step (b). The method can be operated with single use PVPP as well as regenerable PVPP and does not require sophisticated filter hardware for regenerating the PVPP.

14 Claims, 5 Drawing Sheets

(56) References Cited

OTHER PUBLICATIONS

Figure 1B:
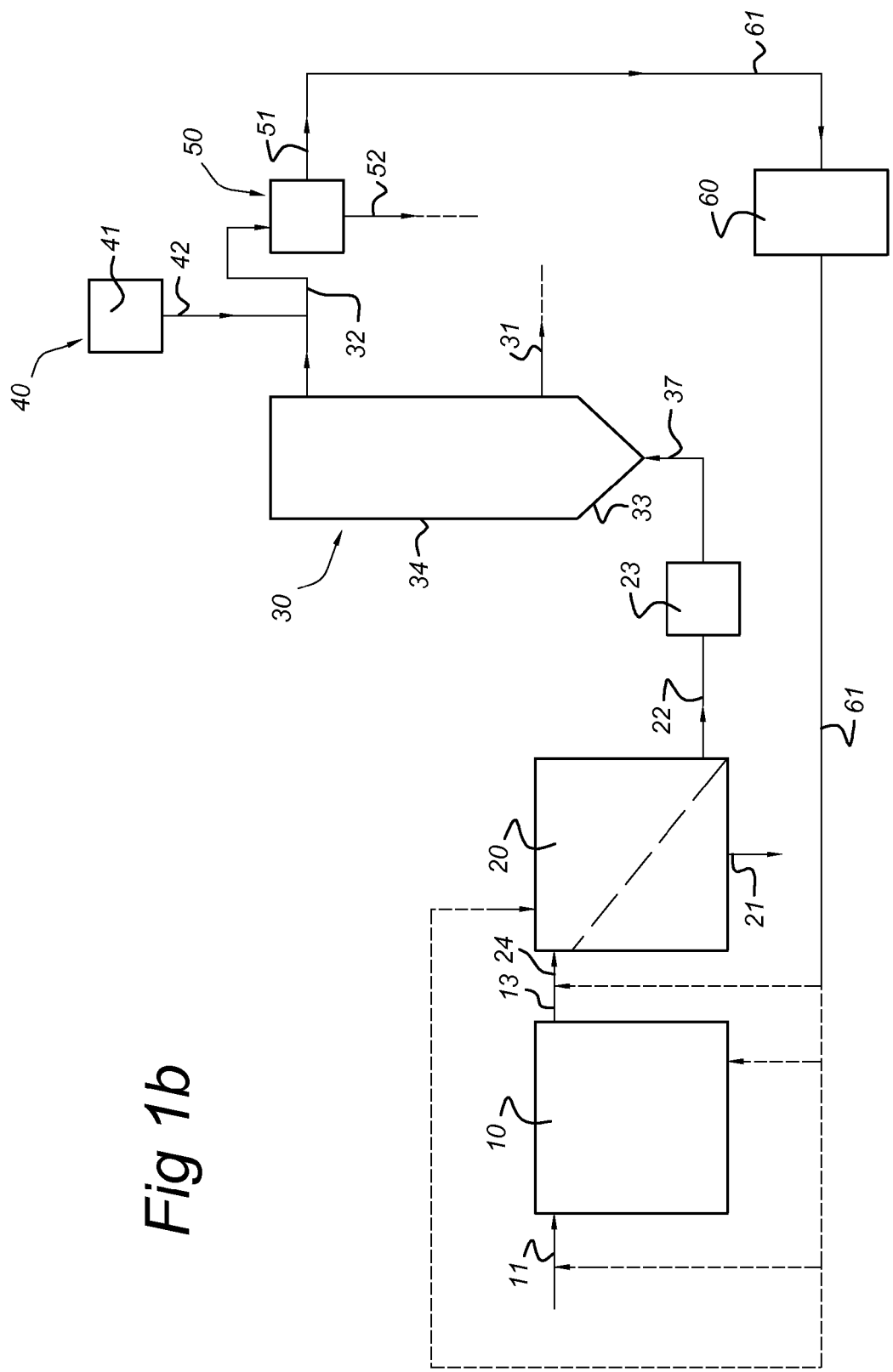

International Search Report for PCT/NL2011/050522—mailed Oct. 4, 2011.
International Search Report for PCT/NL2011/050523—mailed Nov. 10, 2011.
International Search Report for PCT/NL2011/050524—mailed Nov. 10, 2011.
Rehmanji, M. et al: "Beer Stabilization Technology—Clearly a Matter of Choice", Master Brewers Association of the Americas Tech Quarterly, vol. 42, No. 4, 2005, pp. 332-338, XP002614522.

* cited by examiner

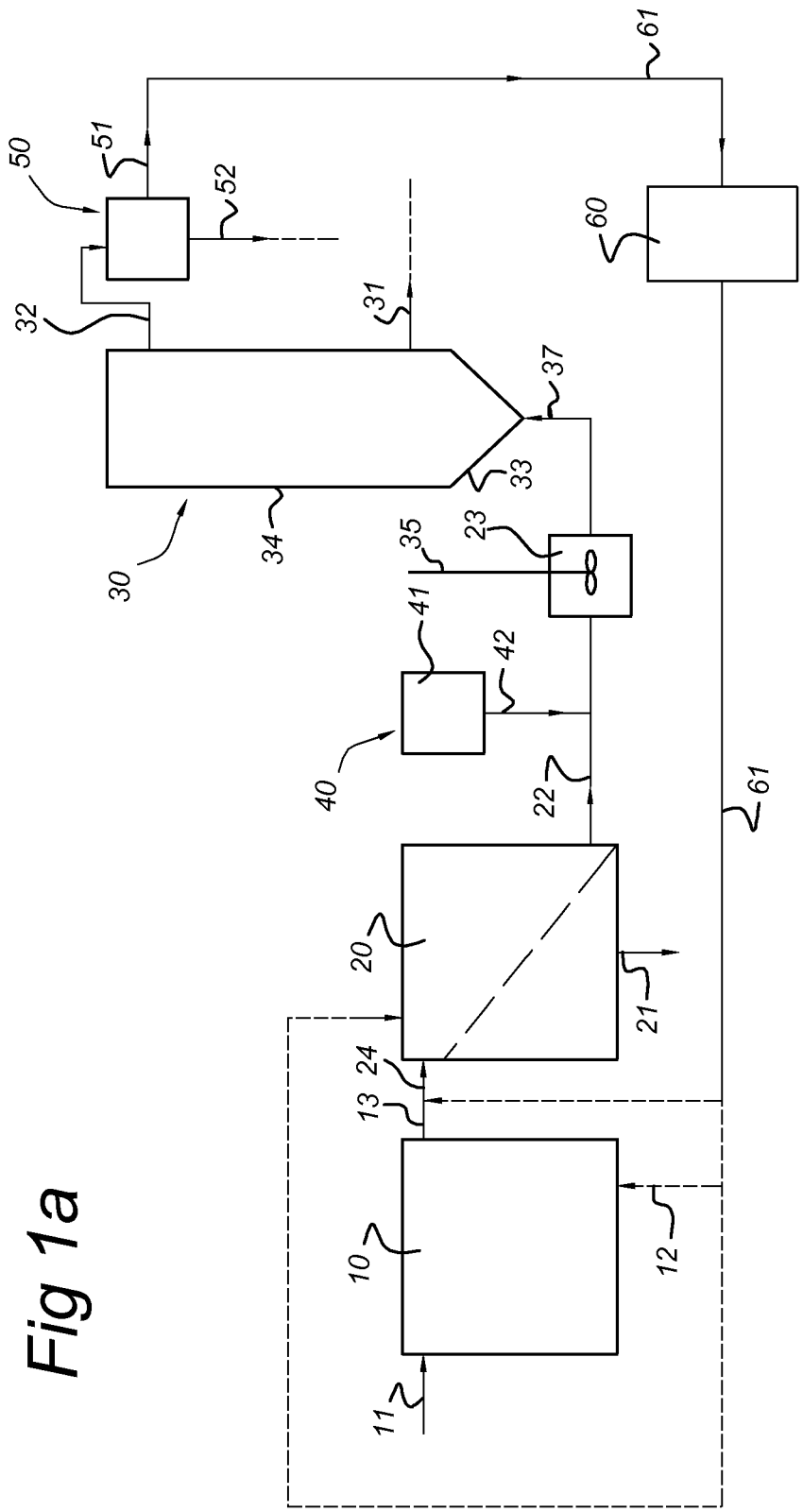

METHOD AND APPARATUS FOR THE RECOVERY OF PVPP AFTER CONTACT WITH A YEAST FERMENTED BEVERAGE BY SEDIMENTATION SEPARATION

CROSS-REFERENCE TO RELATED APPLICATIONS

This application is the National Phase of International Patent Application No. PCT/NL2011/050522, filed Jul. 18, 2011, published as WO 2012/011806, which claims priority to European Application No. 10170419.5, filed Jul. 22, 2010. The contents of these applications are herein incorporated by reference in their entirety.

TECHNICAL FIELD OF THE INVENTION

The present invention relates to a method of stabilising yeast fermented beverages. More particularly, the present invention provides a method of stabilising yeast fermented beverages by combining a yeast fermented liquid with polyvinylpolypyrrolidone (PVPP) particles to bind at least a fraction of the polyphenols and/or the proteins contained in the fermented liquid to said PVPP particles; removing a slurry containing the PVPP particles and yeast from the fermented liquid; and regenerating the PVPP particles.

BACKGROUND OF THE INVENTION

Yeast fermented beverages, such as beer, are stabilised to ensure that the beverage tastes and looks as good at the end of its shelf life as it did after packaging. Since a consumer's first evaluation is a visual one, clarity is taken as a determining measure of beer quality. With a few notable exceptions, consumers expect a bright, appealing product, which is free from haze.

Colloidal haze in beer arises from the formation of polyphenol-protein complexes during storage. Fresh beer contains acidic proteins and a variety of polyphenols. Whilst these can form complexes via loose hydrogen bonding, their low molecular weight means that they are too small to be visible to the naked eye. As these small polyphenols, termed flavanoids, polymerise and oxidise, they produce short chain (condensed) polyphenols termed tannoids. These tannoids are capable of bridging across a number of proteins through hydrogen bonding to form reversible chill haze. After further storage, stronger ionic and covalent bonds form between the tannoids and proteins resulting in irreversible permanent haze. The rate and extent to which this occurs is impacted by the brewing materials, process and storage conditions and can be greatly improved (reduced) by the use of stabilisation aids.

Since the rate-determining factor in the development of haze is the change in the polyphenol fraction, reducing the levels of these haze precursors is a very efficient method of ensuring the colloidal stability of beer. Polyvinylpolypyrrolidone (PVPP) is a cross-linked polymer of (poly)vinylpyrrolidone that is insoluble in water. Highly porous PVPP particles are used in the brewing industry for adsorption of haze polyphenols. PVPP selectively complexes haze polyphenols, predominantly through very strong hydrogen bonding, with multiple attachment sides for haze polyphenols. The molecular structure of the PVPP polymer limits internal hydrogen bonding, maximising the number of available reactive sites.

PVPP stabilisers are either optimised for single use, where they are added to the beer stream and removed on the kieselguhr filter or, for regeneration grades, added to bright beer using dedicated filtration units and recycled for reuse. In either mode many of the initial handling characteristics are common. The PVPP powder is slurried in the dosing tank using softened de-aerated water at a concentration of around 8-12% (wt./vol.). The material must be stirred for at least 15 minutes to swell and hydrate the particles. The slurry should then be kept under constant agitation to prevent settling. In the case of regeneration grades, the stabiliser dosing tank is often maintained at 80° C. to ensure long-term microbial stability.

The most common method of adding single use PVPP is by continuous dosing to the beer stream using a proportioning pump. Although PVPP can be very effective with short contact times, a contact time of 5-10 minutes between the point of addition and removal of the spent PVPP on the kieselguhr filter is recommended for maximum efficiency. PVPP should be added to cold beer, at or below 0° C., to prevent re-dissolution of those polyphenol-protein complexes that have already formed.

The principle of regenerable PVPP use is to break the PVPP-polyphenol bonds through washing the material with a caustic (NaOH) solution. Regeneration is considered to be economic if a brewery stabilises a large output volume and/or the beer being stabilised has an extremely high polyphenol content, that would require high addition rates of PVPP for effective colloidal stabilisation. Regeneration grades of PVPP are specifically manufactured to produce particles of larger size and greater mechanical strength, which still give effective polyphenol reduction. Horizontal leaf filters were the original designs for using and regenerating PVPP, but candle filters are also now entering service.

The initial preparation of regeneration grades of PVPP is very similar to that of the single use product. A dedicated slurry tank is required, often equipped with a heating jacket. The empty filter is first purged with $CO_2$ and a pre-coat of regenerable PVPP of about 1-2 mm in depth is deposited on the filter screens of. The stabiliser slurry is recirculated around the filter till the water at the sight glass or measuring point is clear. PVPP is dosed into the now incoming beer stream using a proportioning pump. The effective stabilisation run is completed when the space between the filter plates is filled with PVPP. The final volume of beer stabilised depends on the size of the filter, PVPP charge and the addition rate into beer and can run to several thousand hl.

At the end of the filtration and stabilisation, residual beer is returned to the beer recovery tank. The used PVPP is regenerated by circulating a caustic (1-2% wt/wt) solution, at 60-80° C. through the PVPP filter bed for between 15-30 minutes. Sometimes, a second caustic rinse is used, with the first cycle run to drain and the second cycle saved for re-use as the first caustic rinse at the next regeneration. The colour of the caustic leaving the filter is very dark, confirming the breakage of the strong PVPP-polyphenol complexes. The PVPP filter cake is then flushed with hot water at 80° C. to displace the caustic solution and reduce pH. This is followed by a rinse cycle with dilute acid until the solution leaving the filter reaches around pH 4 over 20 minutes. Residues from the beer and water are effectively removed and best results are achieved by pre-heating the dilute acid to around 60° C. The filter is then flushed with cold water until the acid is washed out and the pH at the outlet is neutral. Finally $CO_2$, water and the centrifugal force of spinning the filter elements are used to displace the regenerated PVPP from the filter screens to the dosing pot. The solids (PVPP) content in the dosing tank is checked and new material added to make up for process losses. These losses are typically between 0.5-1% per regeneration. However, it is the cost of the filter hardware, rather than that of the PVPP stabiliser, that has a more significant influence on the economics of PVPP regeneration.

Thus, whereas single use PVPP has the disadvantage that it generates a considerable waste stream, regenerable PVPP suffers from the drawback that it requires a considerable upfront investment in sophisticated filter hardware.

WO 99/16531 describes a process for the regeneration of spent filter media that has been used in mechanical filtration of beer and that contains perlite and PVPP. The regeneration process disclosed in WO 99/16531 comprises the following steps:

adding an aqueous liquid comprising about 0.25 to 3.0 weight percent caustic to a regeneration vessel containing a filter cake comprising a filter media and filtrates;
stirring the contents of the regeneration tank for a time not exceeding 18 hours at a temperature not exceeding about 110° F. (43.3° C.);
substantially removing the aqueous liquid from the filter media;
rinsing the filter media with a caustic solution;
rising the filter media with an acid solution; and
rinsing the filter media with water.

Effective removal of yeast cells in this process relies on caustic degradation or modification of these yeast cells and the removal of the degraded/modified yeast cells during rinsing operations.

SUMMARY OF THE INVENTION

The present inventors have developed a method of stabilising yeast fermented beverages by treatment with PVPP particles and regeneration of said used PVPP-particles for re-use. The method according to the present invention can be operated with single use PVPP as well as regenerable PVPP. Furthermore, the present method does not require sophisticated filter hardware for regenerating the PVPP.

In the method of the present invention PVPP particles are added to the yeast fermented liquid prior to clarification. Next, a slurry containing PVPP particles and yeast is removed from the fermented liquid and separated into a yeast-enriched fraction and a PVPP-enriched fraction using sedimentation separation. The PVPP contained in the PVPP-enriched fraction is regenerated during or after the aforementioned separation and the regenerated PVPP is re-used in the method.

More particularly, the present invention provides a method of preparing a yeast fermented beverage, said method comprising the steps of:
a. fermenting wort with a biologically active yeast to produce a fermented liquid containing yeast, alcohol, polyphenols and protein;
b. combining the fermented liquid with polyvinylpolypyrrolidone (PVPP) particles to bind at least a fraction of the polyphenols and/or the proteins contained in the fermented liquid to said PVPP particles, yeast being contained in the fermented liquid in a concentration of at least 5 mg of wet yeast per kg of fermented liquid;
c. removing a slurry containing the PVPP particles and yeast from the fermented liquid;
d. separating said slurry into a yeast-enriched fraction and a PVPP-enriched fraction by means of a sedimentation separation technique selected from flotation separation, settling separation and separation using a hydrocyclone;
e. regenerating the PVPP particles before, during and/or after the separation into the yeast-enriched fraction and the PVPP-enriched fraction by desorbing polyphenols and/or protein from said PVPP-particles and separating the desorbed polyphenols and/or the desorbed protein from the PVPP particles; and
f. recirculating the regenerated PVPP particles to step b.

The present method of recycling PVPP particles offers the advantages that it is very robust and that it enables efficient recovery of PVPP particles, including single use PVPP particles, for re-use.

The use of sedimentation separation to separate PVPP particles from yeast cells offers the important advantage that the PVPP particles can be regenerated without difficulty and that even after repeated regeneration cycles the PVPP particles retain their high affinity for polyphenols and proteins.

Sedimentation separation offers the additional advantage that it can be carried out in relatively simple and robust equipment (settling vessels, flotation vessels, hydrocyclones). Furthermore, sedimentation separation can suitably be combined with at least a part of the PVPP regeneration procedure, e.g. by combining the slurry with a caustic solution prior to the sedimentation separation.

Another aspect of the invention relates to an apparatus for preparing a yeast fermented beverage, said apparatus comprising:
a fermentation vessel 10 for fermenting wort with a biologically active yeast to produce a fermented liquid containing yeast, alcohol, polyphenols and protein, the fermentation vessel 10 being arranged to receive wort and comprises an outlet 13 for outputting a fermented liquid containing yeast, alcohol, polyphenols and protein;
a PVPP dosing device 60 for combining the fermented liquid with polyvinylpolypyrrolidone (PVPP) particles to bind at least a fraction of the polyphenols and/or the proteins contained in the fermented liquid to said PVPP particles,
a filter device 20 arranged to receive the fermented liquid, the filter device 20 comprising an outlet 22 for outputting a slurry containing the PVPP particles and yeast separated from the fermented liquid by the filter device 20,
a sedimentation separation device 30 for receiving the slurry selected from a flotation separator, a settling separator and a hydrocyclone, the sedimentation separation device 30 comprising a first outlet 31 for outputting a yeast-enriched fraction and a second outlet 32 for outputting PVPP-enriched fraction, said sedimentation separation device being selected from a flotation separator, a hydrocyclone and a sedimentation separator,
a caustic feed 40 for feeding a caustic liquid to regenerate the PVPP particles by desorbing polyphenols and/or protein from said PVPP-particles, the caustic feed being positioned downstream of filter device 20,
a further separation device 50 for separating the desorbed polyphenols and/or the desorbed protein from the PVPP particles, the further separation device 50 being positioned downstream of the caustic feed 40, and
a recirculation path 61 to recirculate the regenerated PVPP particles.

The caustic feed 40 may for instance be fed to a buffer volume 23 in the outlet 22, an inlet to the sedimentation separation device 30, the sedimentation device 30, or combined downstream the separation device with the outlet for the PVPP fraction from the separation device. The further separation device 50 may comprise an inlet and an outlet for regenerated PVPP particles 51 and an outlet for aqueous liquid containing desorbed polyphenols and/or proteins 52.

The further separation device 50 may be positioned downstream with respect to the sedimentation separation device 30, such that the inlet of the further separation device 50 is arranged to receive the PVPP-enriched fraction from outlet 32 and the outlet for regenerated PVPP particles 51 is connected to the recirculation path 61. The further separation device 50 may alternatively be positioned upstream with respect to the sedimentation separation device 30, such that the inlet of the further separation device 50 is arranged to receive the slurry containing the PVPP particles and yeast from outlet 22 and the outlet for regenerated PVPP particles 51 is connected to an inlet 37 of the sedimentation separation device 30.

DRAWINGS

Figure 1C:
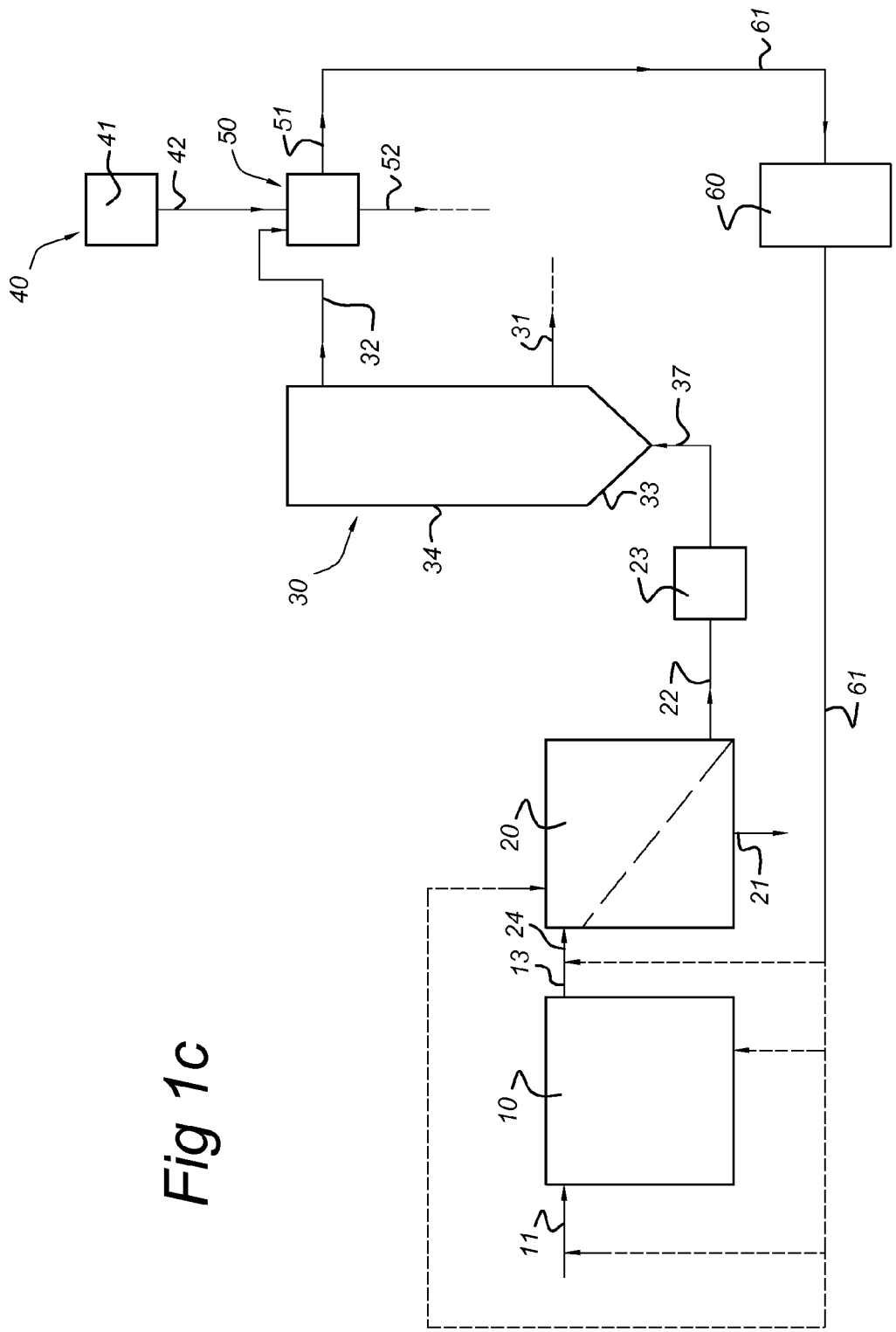
Figure 1D:
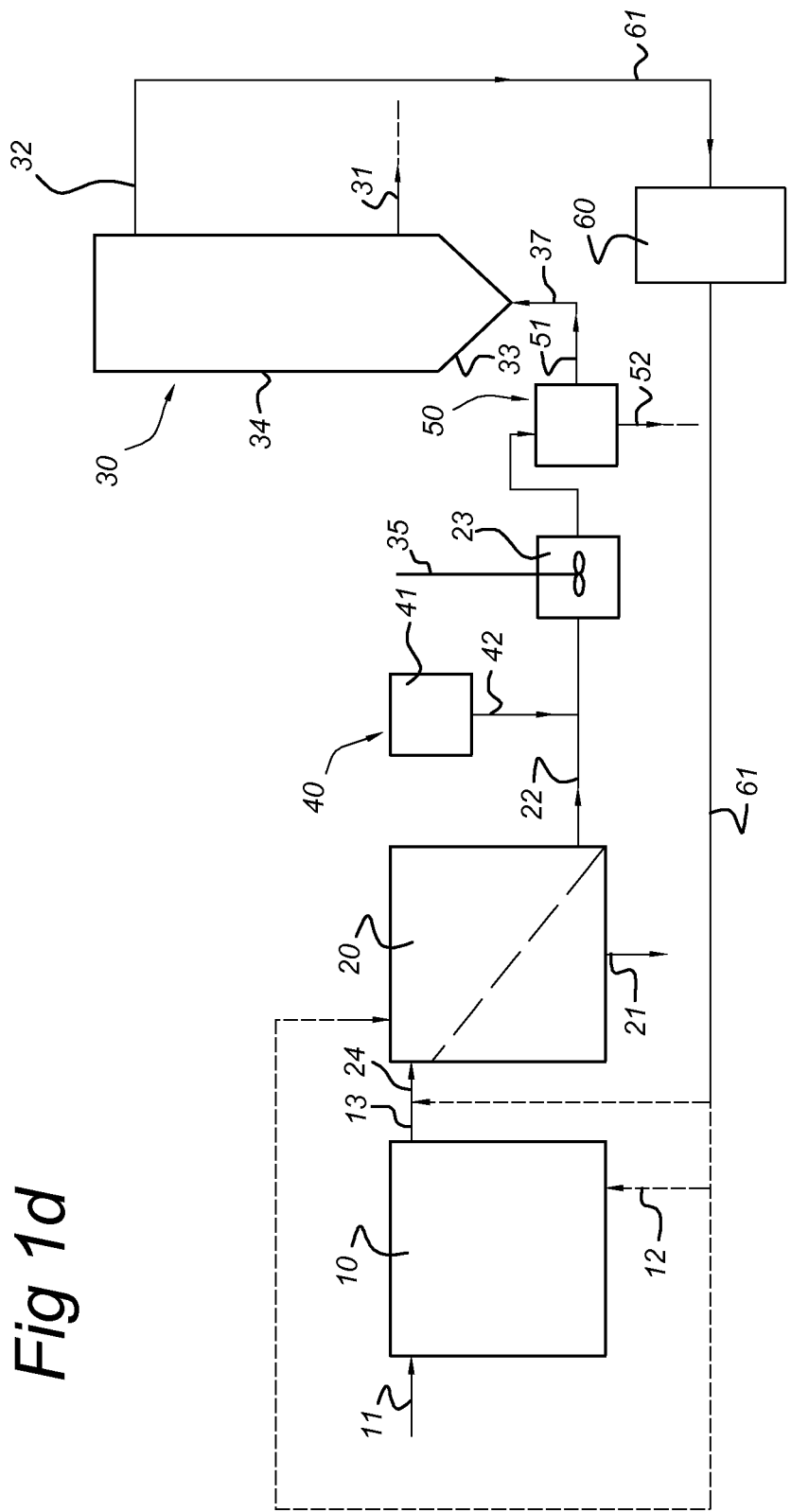
Figure 2:
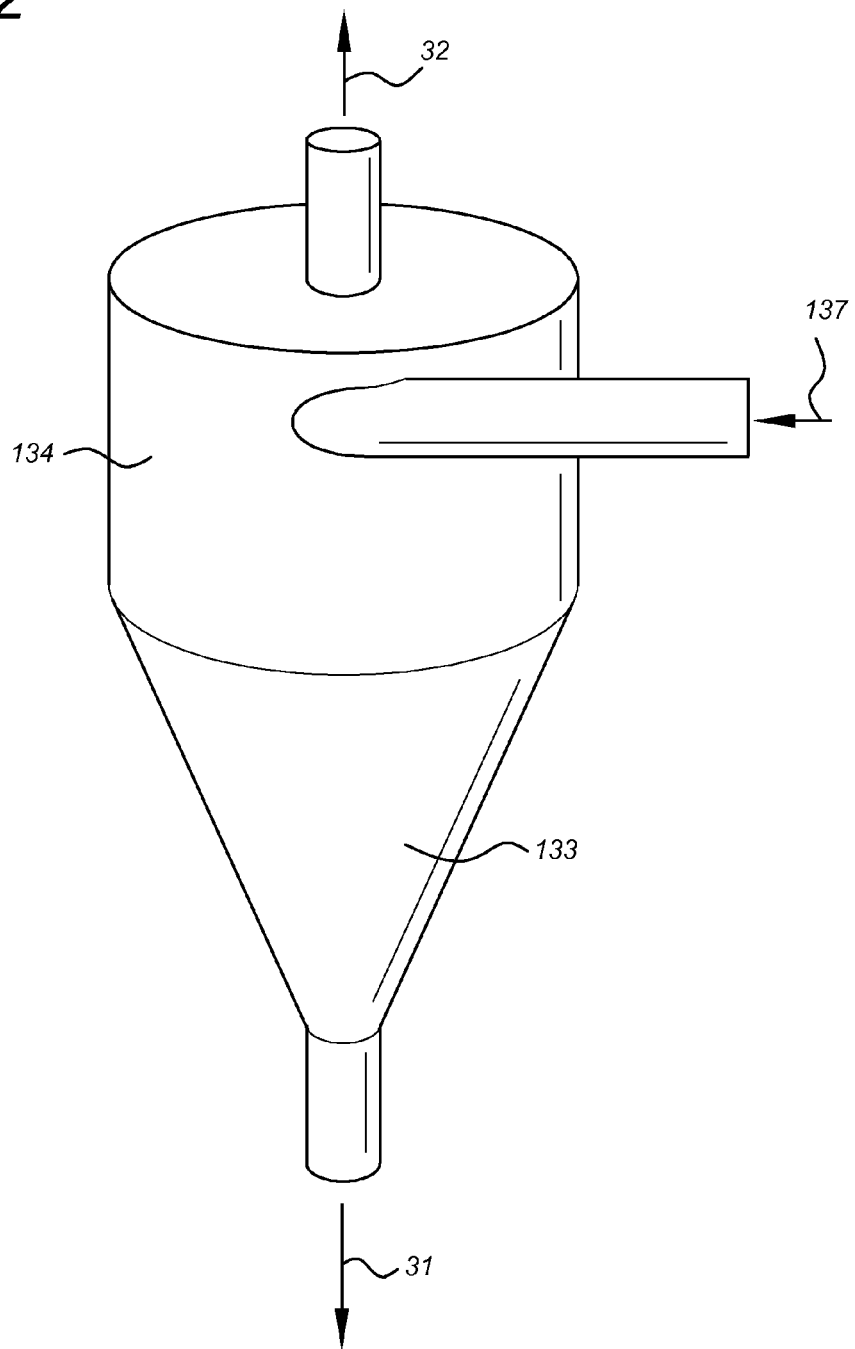

Embodiments will now be described, by way of example only, with reference to the accompanying schematic drawings in which corresponding reference symbols indicate corresponding parts, and in which:

FIG. 1a to 1d show schematic representations of apparatus for carrying out the method of the present invention, said apparatus comprising a fermentation vessel, a membrane filter, a vessel for holding aqueous caustic liquid, a sedimentation separation device and a sieve, and FIG. 2 schematically shows a hydrocyclone.

DETAILED DESCRIPTION OF THE INVENTION

Accordingly, one aspect of the present invention relates to a method of preparing a yeast fermented beverage, said method comprising the steps of:
a. fermenting wort with a biologically active yeast to produce a fermented liquid containing yeast, alcohol, polyphenols and protein, yeast being contained in the fermented liquid in a concentration of at least 5 mg of wet yeast per kg of fermented liquid;
b. combining the fermented liquid with polyvinylpolypyrrolidone (PVPP) particles to bind at least a fraction of the polyphenols and/or the proteins contained in the fermented liquid to said PVPP particles;
c. removing a slurry containing the PVPP particles and yeast from the fermented liquid;
d. separating said slurry into a yeast-enriched fraction and a PVPP-enriched fraction by means of a sedimentation separation technique selected from flotation separation, settling separation and separation using a hydrocyclone;
e. regenerating the PVPP particles before, during and/or after the separation into the yeast-enriched fraction and the PVPP-enriched fraction by desorbing polyphenols and/or protein from said PVPP-particles and separating the desorbed polyphenols and/or the desorbed protein from the PVPP particles; and
f. recirculating the regenerated PVPP particles to step b.

The term "wort" as used herein refers to the liquid extracted from the mashing process during the brewing of e.g. beer or whisky. Wort contains sugars, derived from a grain source, such as malt, that are fermented by the brewing yeast to produce alcohol, flavour etc.

The terminology "sedimentation separation" as used herein refers to a separation technique in which solid particles that are suspended in a liquid are separated on the basis of a difference in density. Sedimentation is the tendency for particles in suspension to settle out of the fluid in which they are entrained in response to a separation force, such as gravity and/or centrifugal acceleration.

Whenever reference is made herein to the binding/desorption of polyphenols and/or the proteins to/from PVPP particles what is meant is that polyphenols or protein are bound to or desorbed from the PVPP-particles as such or as part of complexes of e.g. (polymerised) polyphenols and proteins.

The fermented liquid containing the PVPP particles typically comprises yeast in a concentration of at least 5 mg of wet yeast per kg of fermented liquid. More preferably said yeast concentration lies within a range of 10-10,000 mg of wet yeast per kg of fermented liquid, most preferably within a range of 50-10,000 mg of wet yeast per kg of fermented liquid. The amount of wet yeast contained in a fermented liquid may suitably be determined by a standard consistency measurement, i.e. taking a weighted amount of sample from the fermentation liquid, next centrifuge this and decant the supernatant and finally measure the weight of the centrifuged pellet.

Typically, in the present method the PVPP-particles are combined with the fermented liquid in a weight ratio of 1:100,000 to 1:100, more preferably in a weight ratio of 1:30,000 to 1:1000.

In the present method, the combining of the fermented liquid and the PVPP particles is suitably achieved by mixing the fermented liquid with the PVPP particles.

The slurry that is removed from the fermented liquid typically contains at least 0.1 g/l, more preferably 1-200 g/l of the PVPP particles.

It is further preferred that at least 95 wt. % of the wetted PVPP particles contained in the slurry have a density of less than 1.2 g/ml, preferably of 1.0-1.1 g/ml.

In the present method, the slurry containing the PVPP particles and yeast may be removed from the fermented liquid using a separation device 20 which may be based upon different solid-liquid separation techniques. Preferably, said slurry is removed from the fermented liquid by means of filtration. Examples of filters that may be suitably used to remove the slurry from the fermented liquid include membrane filters, sheet filters and kieselguhr filters. The benefits of the present invention are most pronounced in case the slurry is removed from the fermented liquid by means of kieselguhr filtration or membrane filtration.

In case of kieselguhr filtration, the removed slurry not only contains PVPP particles and yeast, but also kieselguhr particles. It was found that despite the presence of kieselguhr particles, sedimentation separation may suitably be used to separate yeast and PVPP particles. The bulk of the coarser (pre-coat) kieselguhr particles end up in the yeast-enriched fraction, while the PVPP-enriched fraction contains the smaller bodyfeed type of kieselguhr particles; the PVPP enriched fraction can be regenerated relatively easily and be used as part of the bodyfeed in a subsequent filtration.

According to a particularly preferred embodiment of the present method, the slurry is removed from the fermented liquid by means of membrane filtration. Membrane filtration offers the advantage that it enables the recovery and regeneration of PVPP-particles in very high yields, without the disturbing presence of other processing aids such as kieselguhr.

Membrane filtration may suitably be employed in the present method not only to remove PVPP particles and yeast, but also to remove other haze-forming components. Thus, in accordance with a preferred embodiment, the permeate obtained from the membrane filter is a clear, clarified liquid. The aforementioned membrane filter typically has a pore-size in the range of 0.1-5 μm, more preferably of 0.2-1 μm.

In case the present method employs a membrane filter to remove the slurry, it is preferred not to employ a filter aid, other than PVPP particles.

As explained herein before, the present method can be carried out using single use PVPP particles as well as regenerable PVPP particles. Typically, these PVPP particles have a mass weighted average diameter of 10-300 μm. In accordance with one embodiment of the present invention, the method employs single use PVPP particles having a mass weighted average diameter of 10-60 μm, more preferably of 12-50 μm. According to another embodiment, the present method employs regenerable PVPP particles having a mass weighted average diameter of 30-300 μm, more preferably of 40-200 μm.

The PVPP particles used in the present method preferably have a specific surface area of more than 0.1 m²/g. Typically, the specific surface area of the PVPP particles lies within the range of 0.15-5 m²/g.

An essential element of the regeneration of the PVPP particles is the desorption of the polyphenols and/or proteins that are bound to the PVPP particles. Preferably, the polyphenols and/or proteins are desorbed from the PVPP particles by increasing the pH to at least 10.0, more preferably to at least 11.0.

The present method offers the advantage it is possible to desorb the polyphenols and/or proteins from the PVPP particles during the separation of the slurry into a yeast-enriched fraction and a PVPP-enriched fraction, by combining the liquid comprising the slurry with a caustic aqueous liquid prior to or during the sedimentation separation to increase the pH of the combined liquids to at least 10.0, preferably to at least 11.0. Preferably, the liquid comprising the slurry is combined with caustic liquid prior to the sedimentation separation.

Separation of desorbed polyphenols and/or proteins from the PVPP particles is suitably achieved by passing the PVPP-enriched fraction through a further separation device 50 (described in more detail below), for instance comprising a filter or sieve. The PVPP-enriched fraction is passed over the filter or the sieve, said filter or sieve being permeable to the polyphenols and/or proteins but impermeable to the PVPP particles. Advantageously, the filter or sieve employed to separate desorbed polyphenols and/or proteins from the PVPP particles has a pore size in the range of 1-50 μm.

In accordance with an alternative embodiment, the separation of the desorbed polyphenols and/or proteins from the PVPP particles is achieved by providing one or more hydrocyclones as further separator 50 and passing the (desorbed) PVPP-enriched fraction through said one or more hydrocyclones.

Alternatively, separation of desorbed polyphenols and/or protein from the desorbed PVPP particles can be achieved before the separation of the slurry into a yeast-enriched fraction and a PVPP-enriched fraction, by passing the slurry containing desorbed PVPP particles and yeast through a separation device, for instance comprising a filter or sieve, said filter or sieve being permeable to the polyphenols and/or proteins but impermeable to the PVPP particles.

In accordance with yet an alternative embodiment, the separation of the desorbed polyphenols and/or proteins from the slurry containing desorbed PVPP particles and yeast is achieved by passing said slurry through one or more hydrocyclones.

A hydrocyclone is a device to classify, separate or sort particles in a liquid suspension based on the densities of the particles. In a hydrocyclone the separation force is provided by a centrifugal force, possibly in combination with the gravitational force. Hydrocyclones normally have a cylindrical section at the top where liquid is being fed tangentially, and a conical base. A hydrocyclone has two exits on the axis: the smaller on the bottom (underflow or reject) and a larger at the top (overflow or accept). The underflow is generally the denser or thicker fraction, while the overflow is the lighter or more fluid fraction. In the present method, the underflow typically represents not more than 60 wt. % of the feed, more preferably said underflow represents 10-50 wt. % of the feed.

In case no caustic liquid is employed during the sedimentation separation to desorb polyphenols and/or proteins, such a caustic liquid is advantageously added to the PVPP-enriched fraction prior to or during the aforementioned filtration or sieving step in the further separation device 50. Thus, the present method preferably comprises the addition of a caustic aqueous liquid having a pH of at least 10, preferably of at least 11.0, to the PVPP-enriched fraction liquid during the filtration or sieving, or passing through a hydrocyclone, all as examples of separation device 50.

The present method may suitably employ different sedimentation separation techniques to separate the slurry containing the PVPP particles and yeast into a yeast-enriched fraction and a PVPP-enriched fraction. The sedimentation separation techniques employed are gravitational sedimentation (flotation or settling) and centrifugal sedimentation in hydrocyclones.

Step d) of the present method typically comprises feeding the slurry into a sedimentation separation device 30, subjecting the slurry to a sedimentation force, being at least one of a gravitational force and a centrifugal force, the sedimentation force separating the slurry into a yeast enriched fraction and a PVPP enriched fraction and separately removing the yeast enriched fraction and a PVPP enriched fraction from the separation device in step d).

In general, sedimentation occurs when the density of particles suspended in a liquid is different (i.e. greater) than the density of that liquid. Under influence of a sedimentation force, the particles tend to settle, the rate of settling being determined by e.g. the density and diameter of the particles.

Settling occurs when the density of a particle suspended in a liquid is greater than the density of that liquid. The forces acting on particles in suspension include the force of buoyancy $F_b$, the force of friction $F_f$ and the force of gravity $F_g$.

The buoyant force is equal to the weight of the liquid displaced by the particle and acts in an upward direction. Kinetic friction is created when a particle slides over molecules of the surrounding liquid. By effectively slowing the downward movement of the particle, the force of friction acts in an upward direction. The terminal falling velocity $v_t$ of a single particle, which per Newton's first law is assumed to be constant, can be described by the following formula:

$$v_t = \frac{2}{9} \frac{gr^2}{\eta}(\rho_p - \rho_l) \quad [9]$$

Where g is the acceleration due to gravity, r is the radius of the particle, $\eta$ is the viscosity of the liquid, $\rho_p$ is the density of the particle and $\rho_l$ is the density of the liquid.

The aforementioned equation assumes that there is an individual, spherical particle in a (laminar) flow and ignores the effect of tube or vessel wall diameter. In practice, the rate of sedimentation of a suspension of fine particles is difficult to predict because particles are neither spherical nor individual, nor is the flow 100% laminar. Additional considerations for particle flow are the size and shape of the vessel, which affect the degree of turbulence. Furthermore, flocculation of particles will occur due to intermolecular interactions, increasing the effective radius of the particles while decreasing the effective density.

Flotation of particles is governed by the same force balances as settling. Flotation can be used for solids classification when there is a mixture of particles of different density in suspension. Different types of flotation exist. Sink and float processes involve solids of different densities in a liquid of intermediate density. Less dense particles float while more dense particles sink to the bottom. This technique is often used in the mining industry.

Solids classification can occur between particles of different sedimentation velocity by the introduction of an upward current sufficient to float one type of particle while still allowing the other particle to sediment. In this case, particles with smaller sedimentation velocity will be carried upward with the flow of the liquid towards the top of the tank while the particle with greater sedimentation velocity sediments. The inventors have found that this kind of solids classification can advantageously be used to separate PVPP particles from yeast cells as the sedimentation velocity of yeast cells tends to be significantly higher than that of PVPP particles.

Hence, in accordance with a particularly preferred embodiment, the separation of the slurry into a yeast-enriched fraction and a PVPP-enriched fraction comprises passing a liquid comprising the slurry through a sedimentation separation vessel in an upward flow and by separately removing a yeast enriched fraction and a PVPP enriched fraction, said PVPP enriched fraction being removed downstream (and above) of where the yeast enriched fraction is removed.

It will be understood that the term "separation vessel" as used herein should not be construed narrowly as the vessel may suitably take the shape of, for instance, a standing tube.

In order to achieve effective separation of PVPP particles and yeast cells, it is preferred to pass the slurry containing liquid through the separation vessel at a vertical flow rate of 0.01-10 mm/s, more preferably of 0.04-3 mm/s.

Typically, the separation of the slurry into the yeast-enriched and PVPP-enriched fraction is completed in less than 4 hours, more preferably in less than 2 hours.

The sedimentation separation employed in the present method preferably yields a PVPP-enriched fraction in which the weight ratio of PVPP particles to yeast is substantially higher than the same weight ratio in the yeast-enriched fraction. Accordingly, in a preferred embodiment the weight ratio of PVPP particles to yeast of the PVPP-enriched fraction is at least 3 times, more preferably at least 5 times higher than the same weight ratio of the yeast-enriched fraction.

Likewise, the yeast concentration of the yeast-enriched fraction is at least 3 times, preferably at least 5 times higher than the same concentration in the PVPP-enriched fraction.

The present method may be carried out as a batch process, a semi-continuous process or a continuous process. Preferably, the process is carried out as batch process.

Another aspect of the present invention relates to an apparatus for carrying out a process as described herein before and depicted in FIGS. 1a-d. Said apparatus comprising:

- a fermentation vessel 10 for fermenting wort with a biologically active yeast to produce a fermented liquid containing yeast, alcohol, polyphenols and protein, the fermentation vessel 10 being arranged to receive wort and comprises an outlet 13 for outputting a fermented liquid containing yeast, alcohol, polyphenols and protein;
- a PVPP dosing device 60 for combining the fermented liquid with polyvinylpolypyrrolidone PVPP particles to bind at least a fraction of the polyphenols and/or the proteins contained in the fermented liquid to said PVPP particles,
- a filter device 20 arranged to receive the fermented liquid, the filter device 20 comprising an outlet 22 for outputting a slurry containing the PVPP particles and yeast separated from the fermented liquid by the filter device 20,
- a sedimentation separation device 30 for receiving the slurry selected from a flotation separator, a settling separator and a hydrocyclone, the sedimentation separation device 30 comprising a first outlet 31 for outputting a yeast-enriched fraction and a second outlet 32 for outputting PVPP-enriched fraction,
- a caustic feed 40 for feeding a caustic liquid to regenerate the PVPP particles by desorbing polyphenols and/or protein from said PVPP-particles, the caustic feed 40 being positioned downstream of filter device 20,
- a further separation device 50 for separating the desorbed polyphenols and/or the desorbed protein from the PVPP particles, the further separation device 50 being positioned downstream of the caustic feed 40, and
- a recirculation path 61 to recirculate the regenerated PVPP particles.

The further separation device 50 may be arranged to receive the second outlet 32 of the sedimentation separation device 30 or the outlet 22 of the filter device 20. The further separation device 50 may have an outlet for regenerated PVPP particles 51 and an outlet for aqueous liquid containing desorbed polyphenols and/or proteins 52.

The caustic feed 40 may be provided to feed a caustic liquid to the outlet 22 of the filter device 20, the separation device 50, or to any position in between the outlet 22 and the further separation device 50.

The recirculation path 61 may be arranged to receive regenerated PVPP particles from the outlet for regenerated PVPP particles 51 in case the further separation device 50 is positioned downstream with respect to the second outlet 32 of the sedimentation separation device 30. Alternatively, the recirculation path 61 may be arranged to receive regenerated PVPP particles from the second outlet 32 of the sedimentation separation device 30, in case the further separation device 50 is positioned upstream with respect to the sedimentation separation device 30.

The fermentation vessel 10 comprises a suitable inlet 11 for receiving the wort.

The filter device 20 may be a membrane filter or a kieselguhr filter. Outlet 22 of the filter device 20 may optionally comprise a buffer volume 23 to allow independent operation of the sedimentation separation process.

The filter device 20 comprises an inlet 24 for receiving the fermented liquid from the fermentation vessel 10. The filter device 20 further comprises an outlet for outputting the slurry and a further outlet for outputting clarified fermented liquid 21.

The sedimentation separation device 30 is selected from a flotation separator, a hydrocyclone and a settling separator.

The caustic feed 40 may comprise a vessel 41 for holding the caustic liquid and an output 42 for supplying the caustic liquid from the vessel 41 to the outlet 22 or to the sedimentation separation device 30, or to outlet 32 or to separation device 50. According to an embodiment, the caustic feed 40 supplies the caustic feed directly into the separation device 30. In that case, the outlet 42 of the vessel 41 is directly coupled to the sedimentation separation device 30.

Preferably, the caustic feed is a pumpable fluid, even more preferably an aqueous caustic liquid.

The PVPP dosing device 60 may be arranged to supply PVPP particles to the fermentation vessel 10, the inlet of the fermentation vessel, to the outlet 13 of the fermentation vessel 10 or to the filter device 20 (indicated by the dotted lines in the figures). The PVPP dosing device may comprise a PVPP supply conduit 61 for supplying PVPP particles to the appropriate location in the device.

FIGS. 1*a*-*d* schematically show a flotation separator. According to a particularly preferred embodiment, the sedimentation separation device 30 is a flotation separator.

The flotation separation device 30 advantageously receives the feed from outlet 22 into its lower section via inlet 37, said separation device 30 having an outlet for yeast enriched faction 31 in the lower section of the flotation separation device 30 and an outlet for PVPP-enriched fraction 32 in the upper section of the flotation separation device.

The outlet for yeast enriched fraction 31 may be situated above (downstream) of the position where the flotation separation device 30 receives the feed from outlet 22 or it may be situated below the position where the flotation separation device 30 receives said feed. In accordance with a preferred embodiment, the outlet for yeast enriched fraction 32 is situated above and downstream of the position where the flotation separation device receives the feed from outlet 22.

The flotation separation device 30 preferably comprises a conical lower section 33 and a cylindrical upper section 34. The outlet 22 of the filter device 20 is preferably connected to the lower end of the cylindrical upper section 34 or to the conical lower section 33. Even more preferably, the outlet 22 is connected to the conical lower section 33, most preferably to the bottom end of the conical lower section 33.

The outlet of yeast-enriched fraction 31 is suitably situated at the lower end of the cylindrical upper section 34 or in the conical lower section 33. More preferably, the outlet 31 is situated at the top of the conical lower section, in the lower end of the cylindrical upper section 34 or at the bottom end of the conical lower section 33. Most preferably, the outlet 31 is situated at the top of the conical lower section 33 or at the lower end of the cylindrical upper section 34.

The outlet for PVPP-enriched fraction 32 is preferably situated at the top of the cylindrical upper section of the flotation separation device 30.

FIGS. 1*a*-*c* all depict embodiments wherein the further separation device 50 is positioned downstream with respect to the sedimentation separation device 30, such that the inlet of the further separation device 50 is arranged to receive the PVPP-enriched fraction from outlet 32 and the outlet for regenerated PVPP particles 51 is connected to the recirculation path 61. The caustic feed 40 is positioned upstream with respect to the further separation device 50, for instance upstream with respect to the sedimentation separation device 30, in between theسedimentation separation device 30 and the further separation device 50 or is directly connected to the further separation device 50.

The further separation device 50 may alternatively be positioned upstream with respect to the sedimentation separation device 30 as schematically shown in FIG. 1*d*. The further separation device 50 is positioned such that the inlet of the further separation device 50 is arranged to receive the slurry containing the PVPP particles and yeast from outlet 22, optionally via buffer 23, and the outlet for regenerated PVPP particles 51 is connected to an inlet 37 of the sedimentation separation device 30. Again, the caustic feed 40 is positioned upstream with respect to the further separation device 50. In the example depicted in FIG. 1*d*, the caustic feed 40 is positioned upstream of buffer 23, where the further separation device 50 is positioned downstream of buffer 23. Alternatively, the output 42 of the caustic feed 40 may be directly connected to the further separation device 50.

In general, the output 42 for supplying the caustic liquid of caustic feed 40 may alternatively be connected to the buffer 23.

FIG. 2 schematically shows an example of an alternative sedimentation separation device, i.e. hydrocyclone 30'. A hydrocyclone is a device to classify, separate or sort particles in a liquid suspension based on the densities of the particles.

The hydrocyclone depicted by way of example comprises a cylindrical section 134 at the top where liquid is being fed tangentially (in this case provided by outlet 22, or optionally by buffer 23, for outputting a slurry containing the PVPP particles and yeast separated from the fermented liquid by the filter device 20), and a conical base 133. A hydrocyclone has two exits on the axis: the smaller on the bottom (underflow or reject) being first outlet 31 for outputting the yeast-enriched fraction and a larger at the top (overflow or accept) being second outlet 32 for outputting a PVPP-enriched fraction.

In a hydrocyclone the separation force is provided by a centrifugal force, possibly in combination with the gravitational force.

Alternatively, a settling separator may be used as sedimentation separation device, in which separation is achieved by letting the relatively heavy particles settle at the bottom of the settling separator purely under influence of gravitation. The function thereof will be understood by the skilled person.

As explained herein before, sedimentation separation and desorption of polyphenols and/or proteins can suitably be carried out simultaneously. Accordingly, the present apparatus advantageously comprises a means for providing a caustic feed 40 to the outlet 22 of the filter device 20 (see FIG. 1*a*), for instance to the outlet 22 upstream of the buffer device 23 (see FIG. 1*a*), the buffer device 23 (not shown), the outlet 22 downstream of the buffer device 23 (not shown).

Optionally, stirring means 35 may be provided, preferably provided downstream of the caustic feed 40 and upstream of the sedimentation separation device 30, to promote thorough mixing of the filter retentate and the caustic liquid. The stirring means 35 may for instance be provided in the buffer volume 23 (as shown in FIG. 1*a*) but may also be provided in one of the conduits. According to a further embodiment, the desorption of polyphenols and/or proteins can be carried out downstream of the sedimentation separation device 30, an example of which is shown in FIG. 1*b*. As shown in FIG. 1*b*, the means for providing a caustic feed 40 are now provided in the second outlet for PVPP-enriched fraction 32.

In accordance with a further advantageous embodiment, the outlet for PVPP-enriched fraction 32 is connected to a further separation device 50 having an outlet for regenerated PVPP particles 51 and an outlet for aqueous liquid containing desorbed polyphenols and/or proteins 52, said separation device being selected from the group consisting of filters, sieves and hydrocyclones.

According to yet a further embodiment, the desorption of polyphenols and/or proteins can be carried out inside the separation device 50, an example of which is shown in FIG. 1c. As schematically shown in FIG. 1c, the means for providing a caustic feed 40 are now connected to the separation device 50.

The outlet for regenerated PVPP particles 51 may be connected to a PVPP particle storage 60, from which the PVPP particles may be introduced into the fermentation vessel 10. The PVPP particle storage 60 may thus be arranged to receive regenerated PVPP particles from the further separation device 50 and output PVPP particles to the fermented liquid by means f recirculation path 61.

The invention is further illustrated by means of the following non-limiting example.

EXAMPLE

A freshly prepared slurry of regenerable PVPP particles (Divergan® RS) was dosed into Heineken® unstabilised beer prior to membrane filtration (pore size 0.5 μm). After 3 hours of filtration on the membrane filter, the filter was drained and the used PVPP was collected.

The used PVPP (1 kg) was carried over into a stirred vessel in which it was mixed with 30 liters of a 2% NaOH solution and heated to a temperature of 40° C. The colour of the PVPP/NaOH mixture turned brown immediately when the used PVPP and NaOH solution were combined.

Next, the mixture was pumped at a rate of 90 l/hr through 13 mm diameter tubing to the bottom inlet of a flotation apparatus, made of glass, having a cone shaped lower part and a cylinder shaped upper part. The flotation apparatus had a volume of 15 liters. The cylindrical upper part had a diameter of 20 cm and a height of 54 cm, while the conical lower part had a height of 21 cm. An overflow rich in PVPP particles was removed about 10 cm below the top of the cylindrical upper part while an underflow rich in yeast was removed about 16 cm above the bottom inlet of the flotation apparatus. In the test, the yeast outlet was closed, while the PVPP overflow was fed back to the stirred vessel and hence recirculated. In this time, yeast settled and concentrated visibly near the bottom of the cylindrical part. After 30 min of flotation, samples of PVPP were taken from the overflow.

Samples of fresh, unused PVPP slurry; used PVPP before flotation; and the PVPP samples taken from the flotation apparatus were taken to measure adsorption capacity.

Fresh PVPP had an adsorption capacity of 45%, as measured by a standard analysis in which a catechin solution is contacted with a defined quantity of PVPP and the reduction of catechin in this solution is taken as measure for the adsorption capacity. After filtration on the membrane filter an adsorption capacity of 6% was left. The regenerated PVPP had an adsorption capacity of 52%. The increased adsorption capacity in comparison with the fresh, unused PVPP can be explained by the fact that smaller PVPP particles and non-PVPP dust were washed off during flotation.

The process as executed was very efficient in yeast removal, as up to 95% of the yeast accumulated near the bottom of the cylindrical part of the flotation vessel.

The invention claimed is:

1. A method of regenerating polyvinylpolypyrrolidone (PVPP) particles in preparing a yeast fermented beverage, comprising:

(a) fermenting wort with a biologically active yeast to produce a fermented liquid comprising yeast, alcohol, polyphenols and protein;

(b) combining the fermented liquid with polyvinylpolypyrrolidone (PVPP) particles to bind at least a fraction of the polyphenols and/or the proteins contained in the fermented liquid to the PVPP particles, wherein the yeast in the fermented liquid is at a concentration of at least 5 mg of wet yeast per kg of fermented liquid;

(c) removing a slurry containing the PVPP particles and yeast from the fermented liquid by means of membrane filtration;

(d) separating the slurry into a yeast-enriched fraction and a PVPP-enriched fraction by means of a sedimentation separation technique selected from flotation separation, settling separation and separation using a hydrocyclone;

(e) regenerating the PVPP particles during and/or after the separation (d) by desorbing polyphenols and/or protein from the PVPP-particles and separating the desorbed polyphenols and/or the desorbed protein from the PVPP particles; and (f) recirculating the regenerated PVPP particles to step (b).

2. The method according to claim 1, wherein in step (c) the mixture of fermented liquid and PVPP particles is subjected to membrane filtration and wherein the slurry is obtained as the retentate from the membrane filtration.

3. The method according to claim 2, wherein the membrane filter has a pore-size of 0.1-5 μm.

4. The method according to claim 3, wherein the membrane filter has a pore-size of 0.2-1 μm.

5. The method according to claim 1, wherein the polyphenols and/or proteins are desorbed from the PVPP particles by increasing the pH to at least 10.0.

6. The method according to claim 5, wherein the polyphenols and/or proteins are desorbed from the PVPP particles by increasing the pH to at least 11.0.

7. The method according to claim 5, wherein the separation of the slurry into a yeast-enriched fraction and a PVPP-enriched fraction comprises passing a liquid comprising the slurry through a separation vessel in an upward flow and by separately removing a yeast enriched fraction and a PVPP enriched fraction from the separation vessel, the PVPP enriched fraction being removed downstream of where the yeast enriched fraction is removed.

8. The method according to claim 1, wherein the liquid comprising the slurry is combined with a caustic aqueous liquid prior to or during the sedimentation separation to increase the pH of the combined liquids to at least 10.0.

9. The method according to claim 8, wherein the liquid comprising the slurry is combined with a caustic aqueous liquid prior to or during the sedimentation separation to increase the pH of the combined liquids to at least 11.0.

10. The method according to claim 1, wherein the separation of the desorbed polyphenols and/or proteins from the PVPP particles comprises passing the PVPP-enriched fraction over a filter or a sieve, the filter or sieve being permeable to the polyphenols and/or proteins but impermeable to the PVPP particles.

11. The method according to claim 10, wherein a caustic aqueous liquid having a pH of at least 10 is added to the yeast enriched fraction prior to or during the filtration or the sieving.

12. The method according to claim 11, wherein a caustic aqueous liquid having a pH of at least 11.0 is added to the yeast enriched fraction prior to or during the filtration or the sieving.

13. The method according to claim 1, wherein the separation of the desorbed polyphenols and/or proteins from the PVPP particles comprises passing the PVPP-enriched fraction through one or more hydrocyclones.

14. The method according to claim 1, wherein the weight ratio of PVPP particles to yeast of the PVPP-enriched fraction is at least 3 times higher than the same weight ratio of the yeast-enriched fraction.

* * * * *